US012789133B2

(12) United States Patent
Ahmed et al.

(10) Patent No.: US 12,789,133 B2
(45) Date of Patent: Nov. 10, 2026

(54) METHODS FOR DISSOLVING TARGET CHEMICAL SPECIES INTO ABSORBENT LIQUIDS

(71) Applicant: Saudi Arabian Oil Company, Dhahran (SA)

(72) Inventors: Zeyad Tareq Ahmed, Chassell, MI (US); Serguey Viktorov Arkadakskiy, Edmonton (CA); Noushad Kunnummal, Louisville, KY (US)

(73) Assignee: Saudi Arabian Oil Company, Dhahran (SA)

( * ) Notice: Subject to any disclaimer, the term of this patent is extended or adjusted under 35 U.S.C. 154(b) by 439 days.

(21) Appl. No.: 18/480,640

(22) Filed: Oct. 4, 2023

(65) Prior Publication Data

US 2025/0114737 A1 Apr. 10, 2025

(51) Int. Cl.

*B01D 53/14* (2006.01)
*B01D 53/18* (2006.01)
*B01D 53/22* (2006.01)

(52) U.S. Cl.

CPC ..... *B01D 53/1443* (2013.01); *B01D 53/1475* (2013.01); *B01D 53/18* (2013.01); *B01D 53/226* (2013.01); *B01D 53/229* (2013.01); *B01D 2053/221* (2013.01); *B01D 2252/103* (2013.01); *B01D 2257/504* (2013.01)

(58) Field of Classification Search

CPC ............ B01D 53/1443; B01D 53/1475; B01D 53/18; B01D 53/226; B01D 53/229; B01D 2252/103; B01D 2257/504; B01D 2053/221

See application file for complete search history.

(56) References Cited

U.S. PATENT DOCUMENTS

| | | | |
|---|---|---|---|
| 11,155,462 | B2 | 10/2021 | Arkadakskiy et al. |
| 11,491,439 | B2 | 11/2022 | Arkadakskiy et al. |
| 11,598,187 | B1 | 3/2023 | Ahmed et al. |

(Continued)

FOREIGN PATENT DOCUMENTS

| | | |
|---|---|---|
| CN | 113251814 B | 1/2023 |

OTHER PUBLICATIONS

Chen, "Fabrication and scale-up of multi-leaf spiral-wound membrane modules for CO2 capture from flue gas", https://www.sciencedirect.com/science/article/pii/S0376738819320915, 2020.

(Continued)

*Primary Examiner* — Robert Clemente

(74) *Attorney, Agent, or Firm* — DINSMORE & SHOHL LLP

(57) ABSTRACT

A target chemical species, such as carbon dioxide, may be separated from a mixed gas by passing at least a portion of the mixed gas from a first chamber through a gas-selective membrane and into a second chamber, producing a concentrated gas. The concentrated gas has a higher concentration of the target chemical species than the mixed gas. At least a portion of the concentrated gas is passed through a diffusion-based membrane to a third chamber, where the third chamber includes an absorbent liquid in contact with one side of the diffusion-based membrane. The target chemical species is at least partially dissolved in the absorbent liquid and passed out of the system.

19 Claims, 2 Drawing Sheets

(56) References Cited

U.S. PATENT DOCUMENTS

| | | | | |
|---|---|---|---|---|
| 2015/0328583 | A1* | 11/2015 | Zhou | C10L 3/103 585/818 |
| 2016/0206993 | A1* | 7/2016 | Deng | C10L 3/104 |
| 2020/0360854 | A1 | 11/2020 | Vaidya et al. | |
| 2020/0360855 | A1 | 11/2020 | Vaidya et al. | |
| 2022/0314163 | A1 | 10/2022 | Salazar Duarte et al. | |

OTHER PUBLICATIONS

Gislason et al., "A brief history of CarbFix: Challenges and victories of the project's pilot phase", Energy Procedia, vol. 146, pp. 103-114, 2018.
Gunnarsson et al., "The rapid and cost-effective capture and sub-surface mineral storage of carbon and sulfur at the CarbFix2 site", International Journal of Greenhouse Gas Control, vol. 79, pp. 117-126, 2018.
Janakiram et al., "Three-phase hybrid facilitated transport hollow fiber membranes for enhanced CO2 separation", Applied Materials Today, vol. 21,100801, 12 pages, 2020.
Snoebjornsdottin et al., "Carbon dioxide storage through mineral carbonation", Nature Reviews, Earth & Environment, https://doi.org/10.1038/s43017-019-0011-8, 2020.
Notification of Transmittal of the International Search Report and the Written Opinion of the International Searching Authority, or the Declaration dated Mar. 5, 2025 pertaining to International application No. PCT/US2024/049521 filed Oct. 2, 2024, pp. 1-15.

* cited by examiner

METHODS FOR DISSOLVING TARGET CHEMICAL SPECIES INTO ABSORBENT LIQUIDS

TECHNICAL FIELD

The present disclosure relates to chemical processing and, more specifically, to sequestration of chemicals.

BACKGROUND

Carbon dioxide capture, also referred to as carbon dioxide sequestration, is an advanced technological approach that tackles a critical issue of our time: the excessive buildup of carbon dioxide in the Earth's atmosphere. This technology involves a range of innovative processes and techniques aimed at capturing and confining carbon dioxide emissions from various industrial sources like power plants and manufacturing facilities, as well as directly from the atmosphere itself. Once captured, the carbon dioxide can either be stored deep underground in geological formations or utilized for other purposes, such as enhanced oil recovery or the production of valuable products. Therefore, the development of new and more efficient methods for capturing carbon dioxide will be needed to meet this demand and address the challenges of climate change and sustainable development.

SUMMARY

Described herein are methods for sequestering a target chemical, such as carbon dioxide. In the embodiments described herein, a mixed gas that includes the target chemical may undergo a separation utilizing a gas-selective membrane to form a concentrated gas that includes the target chemical. Following this initial separation, the concentrated gas may be separated utilizing a diffusion-based membrane where the target chemical is passed through the diffusion-based membrane and into an absorbent liquid. Such processes may be utilized to sequester carbon dioxide from a point source that may otherwise be vented into the environment. As is described herein, the utilization of two membranes in series may serve to relatively efficiently sequester a target chemical, such as carbon dioxide, present in a mixed gas that includes carbon dioxide. In particular separation efficiency by the diffusion based membrane may be improved by the utilization of the upstream, gas-selective membrane.

According to one or more embodiments described herein, a method for dissolving a target chemical species into an absorbent liquid may comprise passing a mixed gas into a first chamber. The mixed gas may comprise the target chemical species and at least one other chemical species. The method further comprises at least partially separating the target chemical species from the at least one other chemical species in the mixed gas by passing at least a portion of the target chemical species through a gas-selective membrane and into a second chamber. The second chamber may comprise a concentrated gas, wherein the target chemical species in the concentrated gas in the second chamber has a greater concentration than the target chemical species in the mixed gas in the first chamber. The method may further comprise selectively passing at least a portion of the target chemical species in the concentrated gas through a diffusion-based membrane and into a third chamber. The third chamber may comprise the absorbent liquid and the target chemical species dissolves in the absorbent liquid. The method may further include passing the target chemical species dissolved in the absorbent liquid out of the third chamber.

According to one or more embodiments described herein, a dual-membrane separation apparatus may comprise a first chamber comprising a gas inlet and a second chamber. The first chamber and the second chamber share a first wall, and the first wall is a gas-selective membrane operable to at least partially separate a target chemical species from at least one other chemical species by selectively passing the target chemical species through the gas-selective membrane at a greater rate than the at least one other chemical species. The dual membrane separation apparatus may also comprise a third chamber comprising a liquid inlet and a liquid outlet, wherein the second chamber and the third chamber share a second wall, and wherein the second wall is a diffusion-based membrane operable to pass the target chemical species through the diffusion-based membrane and into an absorbent liquid in direct contact with one side of the diffusion-based membrane.

These and other embodiments are described in more detail in the Detailed Description. It is to be understood that both the foregoing general description and the following detailed description present embodiments of the described technology, and are intended to provide an overview or framework for understanding the nature and character of the described technology as it is claimed. The accompanying drawing is included to provide a further understanding of the described technology and are incorporated into and constitute a part of this specification. The drawing illustrates various embodiments and, together with the description, serve to explain the principles and operations of the described technology. Additionally, the drawing and descriptions are meant to be merely illustrative, and are not intended to limit the scope of the claims in any manner.

BRIEF DESCRIPTION OF THE DRAWING

The following detailed description of specific embodiments of the present disclosure can be best understood when read in conjunction with the following drawing, where like structure is indicated with like reference numerals and wherein.

Figure 1:
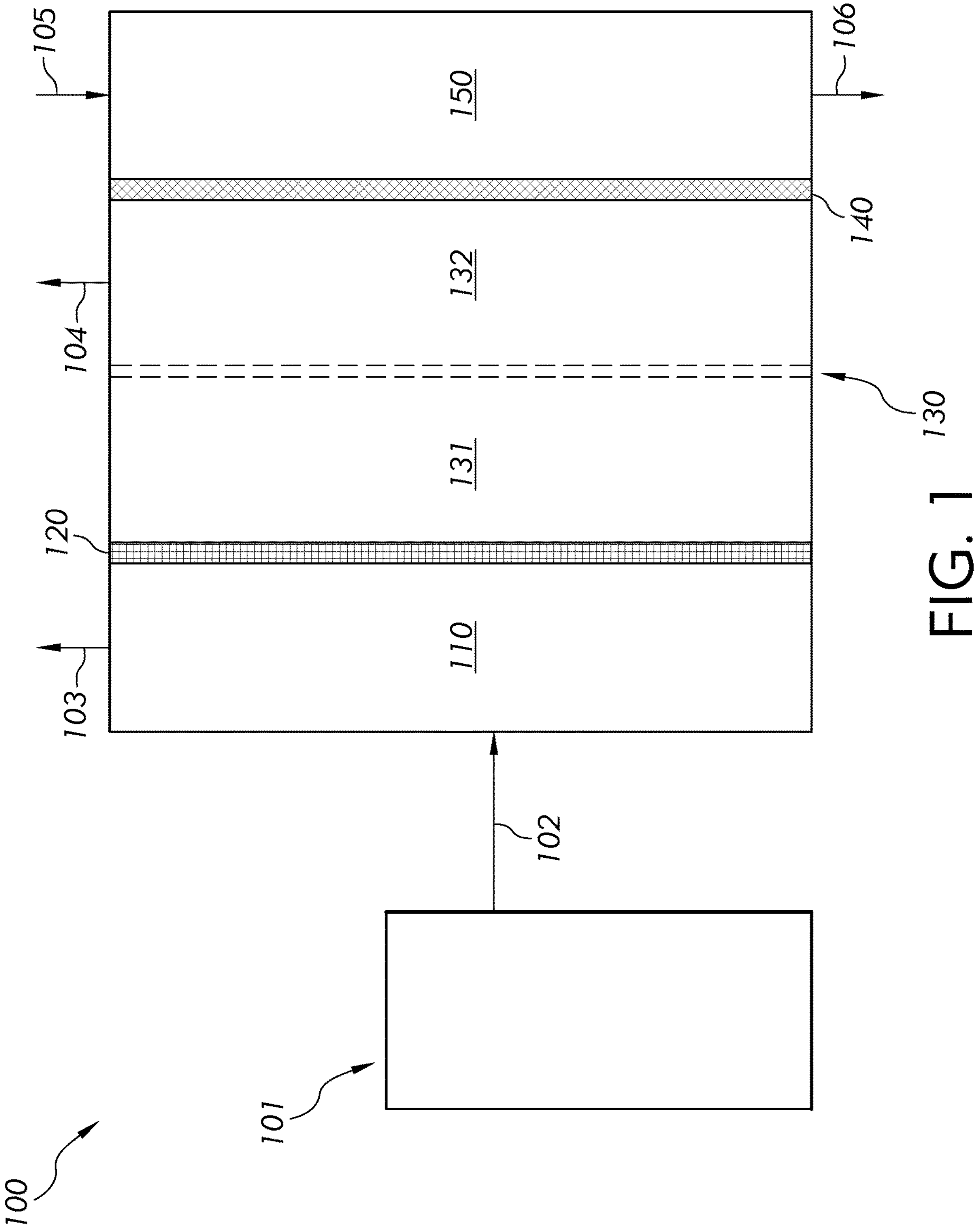
FIG. 1 schematically depicts an apparatus for capturing a target chemical species, according to one or more embodiments disclosed herein.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should be understood that features described in the various drawings may be used in combination with other aspects in different drawings. That is, the embodiment of FIG. 1 may utilize features of the embodiment of FIG. 2, as would be understood by those skilled in the art.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawing. Whenever possible, the same reference numerals will be used throughout the drawing to refer to the same or similar parts.

DETAILED DESCRIPTION

The present disclosure is directed to methods of capturing a target chemical species. Generally, the methods are described herein in the context of processing systems, such as those of FIGS. 1 and 2. However, it should be understood that the methods may be utilized independently of the processing systems described herein, and it is contemplated that other systems may be utilized to practice the presently described technology.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined. Simply dividing a stream into two streams having the same composition is also not considered to comprise an intervening system that changes the composition of the stream.

As used throughout the present disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in this disclosure, a "storage vessel" refers to a container in which one or more fluids may be stored. For example, a storage vessel may store liquid, gas, or a combination of both. The storage vessels are not limited by geometric shape and/or size, and can include tanks, drums, silos, pipelines, and the like.

As used throughout this disclosure, the term "gas-selective membrane" is a membrane that separates gases according to the principle of selective permeation through a membrane surface. The permeation rate of each gas depends on its solubility in the membrane material and on the diffusion rate of the gas. Gases with high solubility and small molecules generally may pass through the membrane relatively quickly, while gases with larger molecules will pass through the membrane more slowly. Gas transfer through a membrane may depend on molecular size in addition to diffusivity and/or solubility.

As used throughout this disclosure, the term "diffusion-based membrane" refers to a membrane wherein gases may travel out of the membrane when the concentration of the soluble gases is greater inside the membrane compared to outside of the membrane. In one or more embodiments, the diffusion-based membrane may utilize a single-component membrane, a selective multicomponent membrane, or combinations thereof.

As used throughout this disclosure, the term "absorbent liquid" refers to any liquid capable of absorbing the target chemical, such as carbon dioxide. In some embodiments, the absorbent liquid may comprise at least 99 wt. % water. In some embodiments, the absorbent liquid may comprise pure water or nearly pure water. However, other liquids are contemplated as long as they may dissolve the target chemical species.

It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. It should be understood that a "separation unit" is a separation unit used primarily for the separation of two or more gases.

Figure 2:
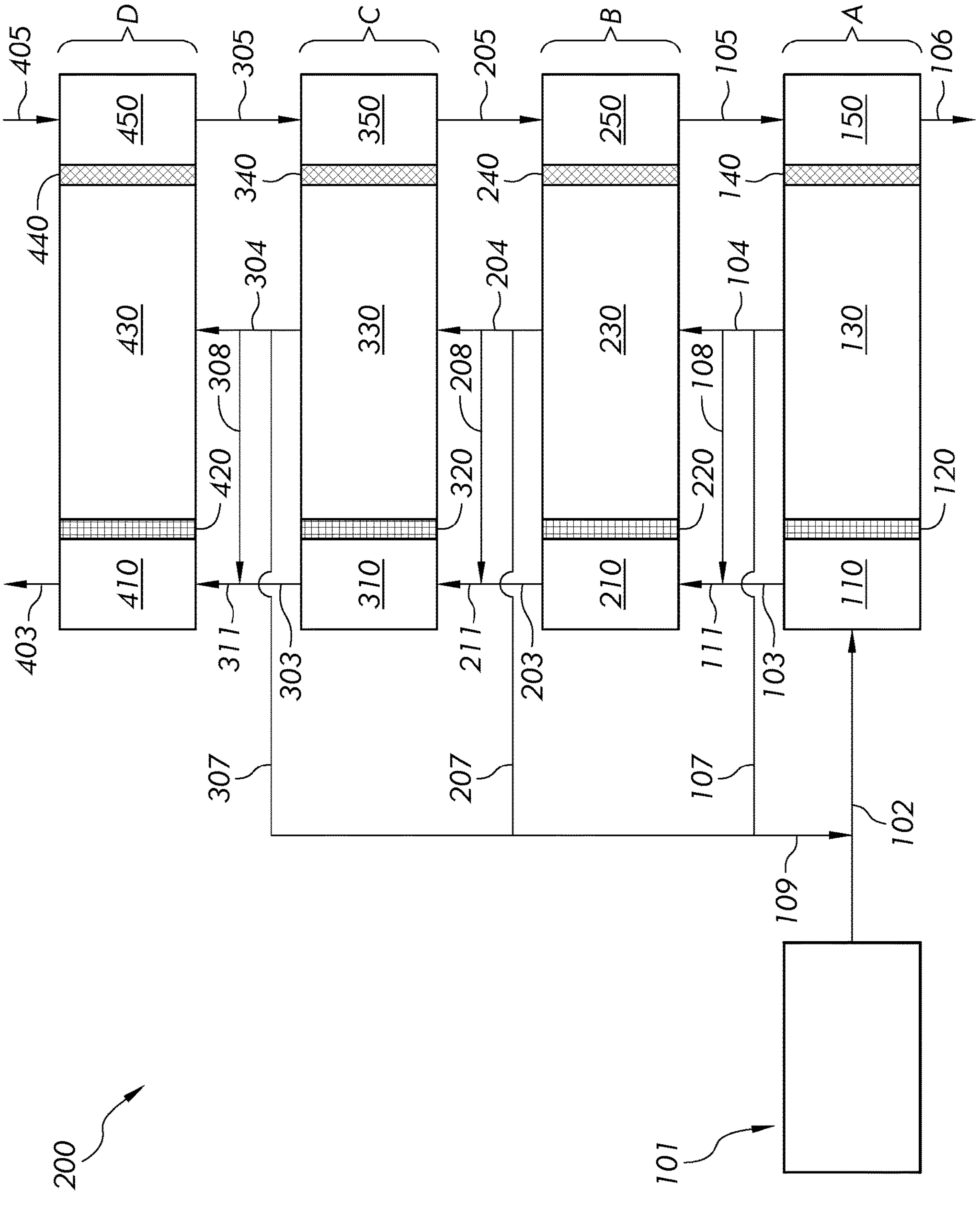
FIG. 2 schematically depicts a system for capturing a target chemical species, according to one or more embodiments disclosed herein.

The methods for capturing a target chemical species described herein may utilize the processing system of FIGS. 1 and 2. The methods are described in the context of the systems of FIGS. 1 and 2, but it is contemplated that many other systems may be suitable for the methods described herein. In particular, other systems and methods than those described with respect to FIGS. 1 and 2 may be suitable, such as, without limitation, alternative separation schemes, alternative stream processing, and the ordering of the separation and/or processing steps disclosed. In particular, FIGS. 1 and 2 will be described in detail herein, where various streams and processes described herein will be described in the context of the system of FIGS. 1 and 2. However, the steps, streams, or other features of the disclosed methods stand independent of the system of FIGS. 1 and 2, and FIGS. 1 and 2 are merely provided to show one or more suitable systems as presently contemplated.

Now referring to FIG. 1, a dual-membrane separation apparatus 100 suitable for dissolving a target chemical species into an absorbent liquid is depicted. The dual-membrane separation apparatus 100 may include a first chamber 110, a gas selective membrane 120, a second chamber 130, a diffusion-based membrane 140, and a third chamber 150. According to embodiments, and as described herein, a target chemical species that is included in a mixed gas may be separated from the mixed gas and dissolved into an absorbent liquid in the third chamber 150.

Still referring to FIG. 1, according to one or more embodiments, a mixed gas may be passed into the first chamber 110 through a gas inlet 102. The gas inlet 102 may be a pipe or other like conduit. The first chamber 110 may be a mechanical apparatus suitable for containing a gas, such as a storage vessel.

In one or more embodiments, the mixed gas comprises a target chemical species and at least one other chemical species. As described herein, the "target chemical species" refers to a chemical species that is selectively separated from the mixed gas and eventually absorbed into the absorbent liquid in the third chamber 150. The one or more other chemical species are any chemical species that is not the target chemical species. It is contemplated that more than a single chemical species may be selectively dissolved in the liquid in the processes described herein. T.

In some embodiments, the target chemical species may be carbon dioxide and/or one of the other chemical species may be nitrogen. The concentration of carbon dioxide in the mixed gas may be from 0.03 wt. % to 99 wt. %, for example from 0.5 wt. % to 99 wt. %, from 1 wt. % to 99 wt. %, from 10 wt. % to 99 wt. %, from 20 wt. % to 99 wt. %, from 30 wt. % to 99 wt. %, from 40 wt. % to 99 wt. %, from 50 wt. % to 99 wt. %, from 60 wt. % to 99 wt. %, from 70 wt. % to 99 wt. %, from 80 wt. % to 99 wt. %, from 90 wt. % to 99 wt. %, from 10 wt. % to 80 wt. %, from 10 wt. % to 70 wt. %, from 10 wt. % to 60 wt. %, from 10 wt. % to 50 wt. %, from 0.03 wt. % to 40 wt. %, from 0.03 wt. % to 30 wt. %, from 0.03 wt. % to 20 wt. %, from 0.03 wt. % to 10 wt. %, from 0.03 wt. % to 1 wt. %, or even from 0.03 wt. % to 0.5 wt. %, or any and all sub-ranges formed by these endpoints.

The concentration of nitrogen in the mixed gas may be from 0 to 99.97 wt. %, for example from 0 wt. % to 99.97 wt. %, for example from 0.5 wt. % to 99.97 wt. %, from 1 wt. % to 99.97 wt. %, from 10 wt. % to 99.97 wt. %, from 20 wt. % to 99.97 wt. %, from 30 wt. % to 99.97 wt. %, from 40 wt. % to 99.97 wt. %, from 50 wt. % to 99.97 wt. %, from 60 wt. % to 99.97 wt. %, from 70 wt. % to 99.97 wt. %, from 80 wt. % to 99.97 wt. %, from 90 wt. % to 99.97 wt. %, from 10 wt. % to 80 wt. %, from 10 wt. % to 70 wt. %, from 10 wt. % to 60 wt. %, from 10 wt. % to 50 wt. %, from 0 wt. % to 40 wt. %, from 0 wt. % to 30 wt. %, from 0 wt. % to 20 wt. %, from 0 wt. % to 10 wt. %, from 0 wt. % to 1 wt. %, or even from 0 wt. % to 0.5 wt. %, or any and all sub-ranges formed by these endpoints.

The mixed gas containing the target chemical species and the at least one other chemical species may be produced from an emission source 101 of a power plant or manufacturing facility, but is not limited to such sources.

Still referring to FIG. 1, the target chemical species may be at least partially separated from the at least one other chemical species in the mixed gas by passing at least a portion of the target chemical species through the gas-selective membrane 120 and into the second chamber 130. Any impermeable gas left within the first chamber 110 may be passed to an atmosphere outside the first chamber 110 through stream 103. As used herein, the term "impermeable gas" refers to any gas, such as the target chemical species, the at least one other chemical species, or both, that does not pass through the gas-selective membrane 120. For example, the impermeable gas within the first chamber 110 may be vented to the atmosphere, recycled through the dual-membrane separation apparatus 100, or the like through stream 103.

As depicted in FIG. 1, the first chamber 110 and the second chamber 130 share a first wall, wherein the first wall is the gas-selective membrane 120. The gas-selective membrane 120 may be operable to at least partially separate the target chemical species from at least one other chemical species by selectively passing the target chemical species through the gas-selective membrane 120 at a greater rate than the at least one other chemical species. The gas-selective membrane 120 may comprise a thin-film polymeric asymmetric membrane or may be made from composite materials such as cellulose, or ceramic. The selectivity of the gas-selective membrane 120 may be from 2:1 to 200:1, for example from 25:1 to 200:1, from 50:1 to 200:1, from 75:1 to 200:1, from 100:1 to 200:1, from 125:1 to 200:1, from 150:1 to 200:1, from 175:1 to 200:1, from 2:1 to 200:1, from 2:1 to 150:1, from 2:1 to 100:1, from 2:1 to 50:1, or even from 2:1 to 10:1, or any and all subranges formed by these endpoints.

According to embodiments, gas transferred to the second chamber 130 through the gas-selective membrane 120 may be referred to as a "concentrated gas." As used herein, the term "concentrated gas" refers to any gas more concentrated in the target chemical species than the mixed gas.

In some embodiments, the target chemical species may be carbon dioxide. The concentration of carbon dioxide in the concentrated gas of the second chamber 130 may be from 10 wt. % to 100 wt. %, for example from 20 wt. % to 100 wt. %, from 30 wt. % to 100 wt. %, from 40 wt. % to 100 wt. %, from 50 wt. % to 100 wt. %, from 60 wt. % to 100 wt. %, from 70 wt. % to 100 wt. %, from 80 wt. % to 100 wt. %, from 90 wt. % to 100 wt. %, from 10 wt. % to 90 wt. %, from 10 wt. % to 80 wt. %, from 10 wt. % to 70 wt. %, from 10 wt. % to 60 wt. %, from 10 wt. % to 50 wt. %, from 10 wt. % to 40 wt. %, from 10 wt. % to 30 wt. %, from 10 wt. % to 20 wt. %, or even from 10 wt. % to 15 wt. %, or any and all subranges formed by these endpoints.

As depicted in FIG. 1, the second chamber 130 may comprise a first portion 131 and a second portion 132. The pressure of the concentrated gas may increase between the first portion 131 and the second portion 132. The pressure of the concentrated gas may be increased by a pump, a temperature increase, or the like. Further, at least a portion of the concentrated gas in the second chamber 130 may be passed to an atmosphere outside the second chamber 130 through stream 104. For example, the concentrated gas within the second chamber 130 may be vented to the atmosphere, passed back through the dual-membrane separation apparatus 100, or the like.

Still referring to FIG. 1, at least a portion of the target chemical species in the concentrated gas may be passed through a diffusion-based membrane 140 and into the third chamber 150 to dissolve in an absorbent liquid. The second chamber 130 and the third chamber 150 share a second wall, wherein the second wall is the diffusion-based membrane 140. The third chamber 150 comprises the absorbent liquid that is in direct contact with one side of the diffusion-based membrane 140. The absorbent liquid may enter the third chamber 150 through an inlet 105. The diffusion-based membrane 140 may be operable to at least partially pass the target chemical species in the concentrated gas from the second chamber 130 to the third chamber 150 through the diffusion-based membrane 140. At least a portion of the target chemical species in the concentrated gas is dissolved in the absorbent liquid to form a dissolved gas solution within the third chamber 150. The dissolved gas solution then flows out of the third chamber 150 through an outlet 106. The outlet 106 may be a pipe or other like conduit.

In some embodiments, the concentration of the target chemical species within the absorbent liquid may be as low as 0.1 wt. %. The upper range of saturation level is dependent upon several factors, including but not limited to, environmental conditions such as pressure, temperature, salinity, and others.

Any undissolved gas left within the third chamber 150 may be passed to an atmosphere outside the third chamber 150 (not depicted in FIG. 1). As used herein, the term "undissolved gas" refers to any gas, such as the target chemical species, the at least one other chemical species, or both, that does not dissolve into the absorbent liquid within the third chamber 150. For example, the undissolved gas within the third chamber 150 may be vented to the atmosphere, recycled through the dual-membrane separation apparatus 100, or the like.

Now referring to FIG. 2, a multi-stage dual-membrane system 200 suitable for dissolving a target chemical species into an absorbent liquid is depicted. In one or more embodiments, portions of the multi-stage dual-membrane system 200 may be substantially similar to the apparatus 100 depicted in FIG. 1. The difference between the system 200 depicted in FIG. 2 and the apparatus 100 depicted in FIG. 1 generally relates to the use of multiple stages, where each stage comprises three chambers, a gas-selective membrane, and a diffusion-based membrane. As depicted in FIG. 2, the multi-stage dual-membrane system 200 includes twelve chambers (110, 130, 150, 210, 230, 250, 310, 330, 350, 410, 430, and 450), four gas selective membranes (120, 220, 320, 420), and four diffusion-based membranes (140, 240, 340, and 440).

In embodiments, the mixed gas may be processed in a first separation stage A, which is downstream of a second separation stage B, which is downstream from a third separation stage C, and a fourth separation stage D, which is upstream of the rest of the separation stages. Without being bound by any particular theory, it is contemplated that each stage further decreases the concentration of the target chemical species within the mixed gas. For example, a single stage may remove 50% of the target chemical species from the mixed gas. A three-stage system may remove 95% of the target chemical species from the mixed gas. The number of stages can be selected based on the preferred level of target chemical species capture.

Still referring to FIG. 2, the first separation stage A comprises the first chamber 110, the second chamber 130, and the third chamber 150. The processing of the mixed gas in the first separation stage A is similar to the process described hereinabove of FIG. 1, using the gas-selective membrane 120 and the diffusion-based membrane 140. In the multi-stage dual-membrane system 200 as depicted in FIG. 2, the impermeable gas within the first chamber 110 may be passed upstream to a fourth chamber 210 in the second separation stage B through stream 103. Similarly, the concentrated gas in the second chamber 130 may be passed upstream to a fifth chamber 230 in the second separation stage B through the stream 104. In some embodiments, the concentrated gas within the second chamber 110 may be mixed with stream 103 and passed upstream to the fourth chamber 210 through stream 111. In other embodiments, the concentrated gas within the second chamber 110 may be recycled back to the gas inlet 102 through stream 107.

In embodiments, the impermeable gas passed to the fourth chamber 210 may be processed in the second separation stage B. The second separation stage B comprises the fourth chamber 210, the fifth chamber 230, and a sixth chamber 250. The processing of the mixed gas in the second separation stage B is similar to the process described hereinabove of FIG. 1, using a second gas-selective membrane 220 and a second diffusion-based membrane 240. At least a portion of the target chemical species in the concentrated gas may be dissolved in the absorbent liquid to form a dissolved gas solution within the sixth chamber 250. The dissolved gas solution may flow out of the sixth chamber 250 and downstream into the third chamber 150 of the first separation stage A through an outlet 105.

In some embodiments, the target chemical species may be carbon dioxide, and the amount of carbon dioxide within the absorbent liquid may be from 0.03 wt. % to 99 wt. %, based on the total amount of carbon dioxide in the mixed gas, for example from 0.03 wt. % to 99 wt. %, for example from 0.5 wt. % to 99 wt. %, from 1 wt. % to 99 wt. %, from 10 wt. % to 99 wt. %, from 20 wt. % to 99 wt. %, from 30 wt. % to 99 wt. %, from 40 wt. % to 99 wt. %, from 50 wt. % to 99 wt. %, from 60 wt. % to 99 wt. %, from 70 wt. % to 99 wt. %, from 80 wt. % to 99 wt. %, from 90 wt. % to 99 wt. %, from 10 wt. % to 80 wt. %, from 10 wt. % to 70 wt. %, from 10 wt. % to 60 wt. %, from 10 wt. % to 50 wt. %, from 0.03 wt. % to 40 wt. %, from 0.03 wt. % to 30 wt. %, from 0.03 wt. % to 20 wt. %, from 0.03 wt. % to 10 wt. %, from 0.03 wt. % to 1 wt. %, or even from 0.03 wt. % to 0.5 wt. %, or any and all sub-ranges formed by these endpoints.

In some embodiments, under NIST standard conditions of temperature and pressure, the concentration of the carbon dioxide in water may be from 0.5 grams of carbon dioxide per liter of aqueous solution (g/L) to 1.449 g/L, for example from 0.6 g/L to 1.449 g/L, from 0.7 g/L to 1.449 g/L, from 0.8 g/L to 1.449 g/L, from 0.9 g/L to 1.449 g/L, from 1.0 g/L to 1.449 g/L, from 1.1 g/L to 1.449 g/L, from 1.2 g/L to 1.449 g/L, from 1.3 g/L to 1.449 g/L, or even from 1.4 g/L to 1.449 g/L, from 0.5 g/L to 1.3 g/L, from 0.5 g/L to 1.1 g/L, or even from 0.5 g/L to 0.9 g/L. or any and all sub ranges between these end points. The concentrations listed above are for carbon dioxide dissolved in water, and other absorbent liquids may have different concentration ranges, as would be understood by those skilled in the art.

In the multi-stage dual-membrane system 200 as depicted in FIG. 2, the impermeable gas within the fourth chamber 210 may be passed upstream to a seventh chamber 310 in the third separation stage C through stream 203. Similarly, the concentrated gas in the fifth chamber 230 may be passed upstream to an eighth chamber 330 in the third separation stage C through the stream 204. In some embodiments, the concentrated gas within the fifth chamber 230 may be mixed with stream 203 and passed upstream to the seventh chamber 310 through stream 211. In other embodiments, the concentrated gas within the fifth chamber 230 may be recycled back to the gas inlet 102 through stream 207.

In embodiments, the impermeable gas passed to the seventh chamber 310 may be processed in the third separation stage C. The third separation stage C comprises the seventh chamber 310, the eighth chamber 330, and a ninth chamber 350. The processing of the mixed gas in the third separation stage C is similar to the process described hereinabove of FIG. 1, using a third gas-selective membrane 320 and a third diffusion-based membrane 340. At least a portion of the target chemical species in the concentrated gas may be dissolved in the absorbent liquid to form a dissolved gas solution within the ninth chamber 350. The dissolved gas solution may flow out of the ninth chamber 350 and downstream into the sixth chamber 250 of the second separation stage B through an outlet 205. In some embodiments, the target chemical species may be carbon dioxide, and the concentration of carbon dioxide within the absorbent liquid may be as low as 0.1 wt. %. The upper range of saturation level is dependent upon several factors, including but not limited to, ambient conditions such as pressure, temperature, salinity, and others.

In the multi-stage dual-membrane system 200 as depicted in FIG. 2, the impermeable gas within the seventh chamber 310 may be passed upstream to a tenth chamber 410 in the fourth separation stage D through stream 303. Similarly, the concentrated gas in the eighth chamber 330 may be passed upstream to an eleventh chamber 430 in the fourth separation stage 34 through the stream 304. In some embodiments, the concentrated gas within the eighth chamber 330 may be mixed with stream 303 and passed upstream to the tenth chamber 410 through stream 311. In other embodiments, the concentrated gas within the eighth chamber 330 may be recycled back to the gas inlet 102 through stream 307.

In embodiments, the impermeable gas passed to the tenth chamber 410 may be processed in the fourth separation stage D. The fourth separation stage D comprises the tenth chamber 410, the eleventh chamber 430, and a twelfth chamber 450. The processing of the mixed gas in the fourth separation stage 4 is similar to the process described hereinabove of FIG. 1, using a fourth gas-selective membrane 420 and a fourth diffusion-based membrane 440. At least a portion of the target chemical species in the concentrated gas may be dissolved in the absorbent liquid to form a dissolved gas solution within the twelfth chamber 450. The dissolved gas solution may flow out of the twelfth chamber 450 downstream and into the ninth chamber 350 of the third separation stage C through an outlet 305. In some embodiments, the target chemical species may be carbon dioxide, and the concentration of carbon dioxide within the absorbent liquid may be as low as 0.1 wt. %. The upper range of saturation level is dependent upon several factors, including but not limited to, ambient conditions such as pressure, temperature, salinity, and others.

In the multi-stage dual-membrane system 200 as depicted in FIG. 2, the impermeable gas within the tenth chamber 410 may be passed vented to the atmosphere through stream 403. The absorbent liquid within the system 200 may be introduced to the system through inlet 405. Additionally, if the impermeable gas is recycled through the dual-membrane system 200, each of the streams 107, 207, 307, and 407 may be mixed to recycle the impermeable gas back to the gas inlet 102.

Although the dual-membrane system 200 in FIG. 2 depicts four stages for separation and dissolution of the target chemical species, it is contemplated that the system 200 could contain any number of stages, represented by (N), where (N) is greater than or equal to 2. Each stage comprises a first, second, and third chamber in addition to a gas-selective membrane and a diffusion-based membrane.

As a non-limiting example, a mixed gas may be passed into a first chamber of (N−1) stage, the mixed gas comprising the target chemical species and at least one other chemical species. The target chemical species may then be at least partially separated from the mixed gas by passing at least a portion of the target chemical species through the gas-selective membrane and into a second chamber of the (N−1) stage such that the second chamber of the (N−1) stage comprises a concentrated gas. The target chemical species in the concentrated gas in the second chamber of the (N−1) stage has a greater concentration of the target chemical species than the mixed gas in the first chamber of the (N) stage. Any impermeable gas within the mixed gas from the first chamber of the (N−1) stage may be passed to a first chamber of (N) stage.

At least a portion of the target chemical species in the concentrated gas may be passed through the diffusion-based membrane and into an third chamber of the (N−1) stage. The third chamber of the (N−1) stage comprises the absorbent liquid and the target chemical species dissolves in the absorbent liquid. The target chemical species dissolved in the absorbent liquid is transported out of the third chamber of the (N−1) stage.

The target chemical species may be at least partially separated from the at least one other chemical species in the mixed gas by passing at least a portion of the target chemical species through the gas-selective membrane and into a second chamber of the (N) stage. The second chamber of the (N) stage then comprises the concentrated gas, wherein the concentrated gas in the second chamber of the (N) stage has a greater concentration of the target chemical species than the mixed gas in the first chamber of (N) stage.

In some embodiments, at least a portion of the concentrated gas from the first chamber of the (N−1) stage may be passed to either a first chamber of the (N) stage, a second chamber of the (N) stage, or both. The target chemical species dissolved in the absorbent liquid may be transported out of the third chamber of (N) stage and into the third chamber of the (N−1) stage.

Examples

Examples are provided herein which may disclose one or more embodiments of the present disclosure. However, the Examples should not be viewed as limiting on the claimed embodiments hereinafter provided.

The present disclosure includes multiple aspects. A first aspect is a method for dissolving a target chemical species into an absorbent liquid, the method comprising: passing a mixed gas into a first chamber, the mixed gas comprising the target chemical species and at least one other chemical species; at least partially separating the target chemical species from the at least one other chemical species in the mixed gas by passing at least a portion of the target chemical species through a gas-selective membrane and into a second chamber, such that the second chamber comprises a concentrated gas, wherein the target chemical species in the concentrated gas in the second chamber has a greater concentration than the target chemical species in the mixed gas in the first chamber; selectively passing at least a portion of the target chemical species in the concentrated gas through a diffusion-based membrane and into a third chamber, wherein the third chamber comprises the absorbent liquid and the target chemical species dissolves in the absorbent liquid; and passing the target chemical species dissolved in the absorbent liquid out of the third chamber.

A second aspect of the present disclosure may include the first aspect, wherein the target chemical species is carbon dioxide, and the mixed gas comprises nitrogen as one of the at least one other chemical species.

A third aspect of the present disclosure may include any of the previous aspects, wherein the mixed gas comprises from 50 wt. % to 99 wt. % of carbon dioxide.

A fourth aspect of the present disclosure may include the third aspect, wherein the concentration of carbon dioxide in the absorbent liquid is from 1.2 g/L to 1.4 g/L.

A fifth aspect of the present disclosure may include any of the previous aspects, wherein the absorbent liquid comprises at least 99 wt. % water.

A sixth aspect of the present disclosure may include any of the previous aspects, further comprising increasing pressure between a first portion and a second portion of the second chamber such that the pressure of the concentrated gas increases between the first portion and the second portion.

A seventh aspect of the present disclosure may include any of the previous aspects, further comprising passing at least a portion of the concentrated gas in the second chamber back to the first chamber.

An eighth aspect of the present disclosure may include any of the previous aspects, further comprising passing an impermeable gas within the mixed gas from the first chamber to an atmosphere outside the first chamber.

A ninth aspect of the present disclosure may include any of the previous aspects, further comprising passing undissolved gases from the third chamber to an atmosphere outside the third chamber.

A tenth aspect of the present disclosure may include any of the previous aspects, wherein the concentration of carbon dioxide in the mixed gas is from 50 wt. % to 99 wt. %; the absorbent liquid comprises at least 99 wt. % water; and the concentration of carbon dioxide in the absorbent liquid is from 1.2 g/L to 1.4 g/L.

An eleventh aspect is a method for dissolving a target chemical species into an absorbent liquid, the method comprising: processing a mixed gas in a first separation stage, the processing comprising the method of the first aspect in the first separation stage comprising the first chamber, second chamber, and third chamber; passing at least a portion of the mixed gas from the first chamber of the first separation stage into a fourth chamber of a second separation stage comprising the fourth chamber, a fifth chamber, and a sixth chamber; processing the mixed gas in the second separation stage, the processing comprising: at least partially separating the target chemical species from the at least one other chemical species in the mixed gas by passing at least a portion of the target chemical species through a second gas-selective membrane and into a fifth chamber, such that the fifth chamber comprises a second concentrated gas, wherein the target chemical species in the concentrated gas in the fifth chamber has a greater concentration than the target chemical species in the mixed gas in the fourth chamber; selectively passing at least a portion of the target chemical species in the concentrated gas through a second diffusion-based membrane and into a sixth chamber, wherein the sixth chamber comprises the absorbent liquid and the target chemical species dissolves in the absorbent liquid; and passing the target chemical species dissolved in the absorbent liquid out of the sixth chamber and into the third chamber of the first separation stage.

A twelfth aspect of the present disclosure may include the eleventh aspect, wherein the method further utilizes a third separation stage.

A thirteenth aspect of the present disclosure may include any of the previous aspects, wherein the method utilizes at least five separation stages.

A fourteenth aspect of the present disclosure is a dual-membrane separation apparatus comprising: a first chamber comprising a gas inlet; a second chamber, wherein the first chamber and the second chamber share a first wall, wherein the first wall is a gas-selective membrane operable to at least partially separate a target chemical species from at least one other chemical species by selectively passing the target chemical species through the gas-selective membrane at a greater rate than the at least one other chemical species; and a third chamber comprising a liquid inlet and a liquid outlet, wherein the second chamber and the third chamber share a second wall, and wherein the second wall is a diffusion-based membrane operable to pass the target chemical species through the diffusion-based membrane and into an absorbent liquid in direct contact with one side of the diffusion-based membrane.

A fifteenth aspect of the present disclosure may include the fourteenth aspect, wherein the target chemical species is carbon dioxide, and the mixed gas comprises nitrogen.

A sixteenth aspect of the present disclosure may include any of the previous aspects wherein the second chamber further comprises a first portion and a second portion such that the pressure of the concentrated gas increases between the first portion and the second portion A seventeenth aspect of the present disclosure may include any of the previous aspects, further comprising a recycle pipe operable to pass at least a portion of the concentrated gas in the second chamber to the first chamber.

An eighteenth aspect of the present disclosure may include any of the previous aspects, further comprising a first gas return pipe operable to pass an impermeable gas within the mixed gas from the first chamber to an atmosphere outside the first chamber.

A nineteenth aspect of the present disclosure may include any of the previous aspects, further comprising a second gas return pipe operable to pass an undissolved gas from the third chamber to an atmosphere outside the third chamber.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Any quantitative value expressed in the present application may be considered to include open-ended embodiments consistent with the transitional phrases "comprising" or "including."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition should be appreciated as containing, in some embodiments, a mixture of isomers of that constituent. In additional embodiments, the chemical compounds may be present in alternative forms such as derivatives, salts, hydroxides, etc.

It is also noted that recitations herein of "at least one" component, element, etc., should not be used to create an inference that the alternative use of the articles "a" or "an" should be limited to a single component, element, etc.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "mixed gas" passing from a first system component to a second system component should be understood to equivalently disclose "carbon dioxide" passing from a first system component to a second system component, and the like.

What is claimed is:

1. A method for dissolving a target chemical species into an absorbent liquid, the method comprising:

passing a mixed gas into a first chamber, the mixed gas comprising the target chemical species and at least one other chemical species;

at least partially separating the target chemical species from the at least one other chemical species in the mixed gas by passing at least a portion of the target chemical species through a gas-selective membrane and into a second chamber, such that the second chamber comprises a concentrated gas, wherein the target chemical species in the concentrated gas in the second chamber has a greater concentration than the target chemical species in the mixed gas in the first chamber;

selectively passing at least a portion of the target chemical species in the concentrated gas through a diffusion-based membrane and into a third chamber, wherein the third chamber comprises the absorbent liquid and the target chemical species dissolves in the absorbent liquid, wherein the absorbent liquid is in direct contact with one side of the diffusion-based membrane; and passing the target chemical species dissolved in the absorbent liquid out of the third chamber.

2. The method of claim 1, wherein the target chemical species is carbon dioxide, and the mixed gas comprises nitrogen as one of the at least one other chemical species.

3. The method of claim 2, wherein the mixed gas comprises from 50 wt. % to 99 wt. % of carbon dioxide.

4. The method of claim 2, wherein the concentration of carbon dioxide in the absorbent liquid is from 1.2 g/L to 1.4 g/L.

5. The method of claim 1, wherein the absorbent liquid comprises at least 99 wt. % water.

6. The method of claim 1, further comprising increasing pressure between a first portion and a second portion of the second chamber such that the pressure of the concentrated gas increases between the first portion and the second portion.

7. The method of claim 1, further comprising passing at least a portion of the concentrated gas in the second chamber back to the first chamber.

8. The method of claim 1, further comprising passing an impermeable gas within the mixed gas from the first chamber to an atmosphere outside the first chamber.

9. The method of claim 1, further comprising passing undissolved gases from the third chamber to an atmosphere outside the third chamber.

10. The method of claim 2, wherein the mixed gas comprises from 50 wt. % to 99 wt. % of carbon dioxide;

the absorbent liquid comprises at least 99 wt. % water; and the concentration of carbon dioxide in the absorbent liquid is from 1.2 g/L to 1.4 g/L.

11. A method for dissolving a target chemical species into an absorbent liquid, the method comprising:

processing a mixed gas in a first separation stage, the processing comprising the method of claim 1 in the first separation stage comprising the first chamber, second chamber, and third chamber;

passing at least a portion of the mixed gas from the first chamber of the first separation stage into a fourth chamber of a second separation stage comprising the fourth chamber, a fifth chamber, and a sixth chamber;

processing the mixed gas in the second separation stage, the processing comprising:

at least partially separating the target chemical species from the at least one other chemical species in the mixed gas by passing at least a portion of the target chemical species through a second gas-selective membrane and into a fifth chamber, such that the fifth chamber comprises a second concentrated gas, wherein the target chemical species in the concentrated gas in the fifth chamber has a greater concentration than the target chemical species in the mixed gas in the fourth chamber;

selectively passing at least a portion of the target chemical species in the concentrated gas through a second diffusion-based membrane and into a sixth chamber, wherein the sixth chamber comprises the absorbent liquid and the target chemical species dissolves in the absorbent liquid; and passing the target chemical species dissolved in the absorbent liquid out of the sixth chamber and into the third chamber of the first separation stage.

12. The method of claim 11, wherein the method further utilizes a third separation stage.

13. The method of claim 11, wherein the method utilizes at least five separation stages.

14. A dual-membrane separation apparatus comprising:

a first chamber comprising a gas inlet;

a second chamber, wherein the first chamber and the second chamber share a first wall, wherein the first wall is a gas-selective membrane operable to at least partially separate a target chemical species from at least one other chemical species by selectively passing the target chemical species through the gas-selective membrane at a greater rate than the at least one other chemical species;

a third chamber comprising a liquid inlet and a liquid outlet; and an absorbent liquid in the third chamber, wherein the second chamber and the third chamber share a second wall, wherein the second wall is a diffusion-based membrane operable to pass the target chemical species through the diffusion-based membrane and into the absorbent liquid in direct contact with one side of the diffusion-based membrane.

15. The dual-membrane separation apparatus of claim 14, wherein the target chemical species is carbon dioxide, and the mixed gas comprises nitrogen.

16. The dual-membrane separation apparatus of claim 14, wherein the second chamber further comprises a first portion and a second portion such that the pressure of the concentrated gas increases between the first portion and the second portion.

17. The dual-membrane separation apparatus of claim 14, further comprising a recycle pipe operable to pass at least a portion of the concentrated gas in the second chamber to the first chamber.

18. The dual-membrane separation apparatus of claim 14, further comprising a first gas return pipe operable to pass an impermeable gas within the mixed gas from the first chamber to an atmosphere outside the first chamber.

19. The dual-membrane separation apparatus of claim 14, further comprising a second gas return pipe operable to pass an undissolved gas from the third chamber to an atmosphere outside the third chamber.

* * * * *